United States Patent [19]

Pillari

[11] Patent Number: 5,058,828
[45] Date of Patent: Oct. 22, 1991

[54] OVERWING THRUST REVERSER

[75] Inventor: Anthony Pillari, Mason, Ohio

[73] Assignee: General Electric Company, Cincinnati, Ohio

[21] Appl. No.: 559,815

[22] Filed: Jul. 30, 1990

[51] Int. Cl.$^5$ ............................................. B64D 33/04
[52] U.S. Cl. ........................... 244/110 B; 239/265.29; 239/265.37; 244/23 D
[58] Field of Search .................... 244/110 B, 23 D; 239/265.27, 265.29, 265.37, 265.41; 60/226, 229, 230

[56] References Cited

U.S. PATENT DOCUMENTS

| 3,532,275 | 10/1970 | Hom et al. | |
|---|---|---|---|
| 3,863,867 | 2/1975 | Souslin et al. | 244/12 D |
| 3,874,620 | 4/1975 | Kahler et al. | 244/110 B |
| 3,877,663 | 4/1975 | Curran et al. | 244/110 B |
| 3,907,224 | 9/1975 | Stearns | 244/110 B |
| 3,915,415 | 10/1975 | Pazmany | 244/110 B |
| 3,917,198 | 11/1975 | Sanders | 244/110 B |
| 3,936,017 | 2/1976 | Blythe et al. | 244/110 B |
| 3,981,463 | 9/1976 | Pazmany | 244/110 B |
| 4,030,687 | 6/1977 | Hapke | 244/12.5 |
| 4,093,122 | 6/1978 | Linderman et al. | 239/265.29 X |
| 4,183,478 | 1/1980 | Rudolph | 244/110 B |
| 4,916,895 | 4/1990 | Dubois | 239/265.29 X |

Primary Examiner—Joseph F. Peters, Jr.
Assistant Examiner—Carla Mattix
Attorney, Agent, or Firm—Jerome C. Squillaro

[57] ABSTRACT

A thrust reverser assembly is disclosed for a wing mounted gas turbine engine exhaust nozzle having a fixed outlet for discharging exhaust gases over a surface of the wing. The assembly in accordance with a preferred embodiment includes a deflector having forward and aft ends, and first and second sides joined together by a base. The deflector is positionable in a stowed position around the exhaust nozzle so that the aft end is disposed forward of the nozzle outlet for allowing substantially unobstructed discharge of exhaust gases therefrom, and in a deployed position for changing direction of exhaust gases for thrust reversal. Two pairs of first and second bellcranks are positioned adjacent to respective ones of the deflector sides and means are provided for rotating the bellcranks for moving the deflector between the stowed and deployed positions. The bellcranks control the angular orientation of the deflector so that the deflector aft end is disposed against the wing surface and the base extends outwardly from the wing surface for deflecting exhaust gases upwardly and out the deflector forward end when the deflector is in the deployed position.

18 Claims, 5 Drawing Sheets

OVERWING THRUST REVERSER

TECHNICAL FIELD

The present invention relates generally to thrust reverser assemblies for aircraft gas turbine engines, and, more specifically, to a thrust reverser assembly for an over-the-wing gas turbine engine including an exhaust nozzle.

BACKGROUND ART

Conventional thrust reversers for aircraft gas turbine engines are provided for deflecting exhaust gases discharged from the engine in a generally forward direction upon landing of an aircraft for assisting in braking the aircraft. The thrust reverser is typically designed to translate from a stowed position, wherein it is aerodynamically blended with a conventional nacelle surrounding the engine, to a deployed position spaced rearwardly of the engine exhaust nozzle such that the exhaust gases are turned forwardly while avoiding back pressure in the exhaust gases which would affect performance of the engine.

Target-type thrust reversers for underwing or fuselage mounted engines typically include a pair of symmetrical deflector doors, or deflectors, for providing thrust reversal. In an overwing mounted gas turbine engine, conventional thrust reversers are typically unsymmetrical and must function within a relatively confined area between the engine and the wing. There are several types of conventional target-type overwing thrust reversers which utilize one or more deflectors and various actuators and linkages for positioning the deflectors between stowed and deployed positions.

The required travel of the deflector between the stowed and deployed positions is typically relatively large, thus requiring suitable actuators and linkages. Exemplary conventional actuators typically generate relatively large actuation forces and have relatively long strokes. This is generally undesirable since the actuation system is not compact and the degree of serviceability of the thrust reverser is relatively low in such embodiments.

In one embodiment of an overwing exhaust nozzle assembly, a stationary exhaust fairing defines the exhaust nozzle outlet and is disposed aft of the reverser deflector when stowed. Accordingly, an internally mounted reverser actuation system would necessarily have to extend through the exhaust fairing for operation, which is generally undesirable since a more complex actuation system would therefore be required.

Furthermore, in operation, the thrust reverser is typically deployed when an aircraft is landing and is rolling at relatively high speed. Therefore, it is subject to relatively high air velocity passing over the engine and wing which generates substantial aerodynamic pressure forces on the deflector which must be suitably accommodated for minimizing or preventing buffeting of the deflector during deployment. The forces due to the airflow over the engine during landing are in addition to the forces generated by the exhaust gases discharged from the engine exhaust nozzle against the deflector for thrust reversal, which must also be accommodated by the linkages attaching the deflector to the engine, nacelle, and/or wing.

OBJECTS OF THE INVENTION

Accordingly, one object of the present invention is to provide a new and improved thrust reverser assembly for an aircraft mounted gas turbine engine.

Another object of the present invention is to provide a thrust reverser assembly for an overwing gas turbine engine having a stationary exhaust fairing.

Another object of the present invention is to provide a thrust reverser assembly which is relatively compact and lightweight.

Another object of the present invention is to provide a thrust reverser assembly utilizing a single deflector for obtaining thrust reversal.

Another object of the present invention is to provide a thrust reverser assembly having relatively small actuators with relatively short strokes and relatively small actuation force for providing relatively large translation of a deflector from stowed to deployed positions.

Another object of the present invention is to provide a thrust reverser assembly wherein the actuation means are disposed external to the exhaust nozzle for improving serviceability.

Another object of the present invention is to provide a thrust reverser assembly having a relatively compact actuation means which is effective for providing stable deployment of the deflector for accommodating aerodynamic pressure forces due to airflow and exhaust gases against the deflector during operation.

DISCLOSURE OF INVENTION

A thrust reverser assembly is disclosed for a gas turbine engine and exhaust nozzle, supported by an aircraft wing, having an outlet for discharging exhaust gases over a surface of the wing. The assembly in accordance with a preferred embodiment includes a deflector having forward and aft ends, and first and second sides joined together by a base. The deflector is positionable in a stowed position around the exhaust nozzle so that the aft end is disposed forward of the nozzle outlet for allowing substantially unobstructed discharge of exhaust gases therefrom, and in a deployed position for changing direction of exhaust gases for thrust reversal. Two pairs of first and second bellcranks are positioned adjacent to respective ones of the deflector sides and means are provided for rotating the first bellcrank for moving the deflector between the stowed and deployed positions. The bellcranks are positioned and configured for controlling the angular orientation of the deflector so that the deflector aft end is disposed against the wing surface and the base extends outwardly from the wing surface for deflecting exhaust gases upwardly and out from the deflector forward end when the deflector is in the deployed position.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

MODE(S) FOR CARRYING OUT THE INVENTION

Figures 1, 5:
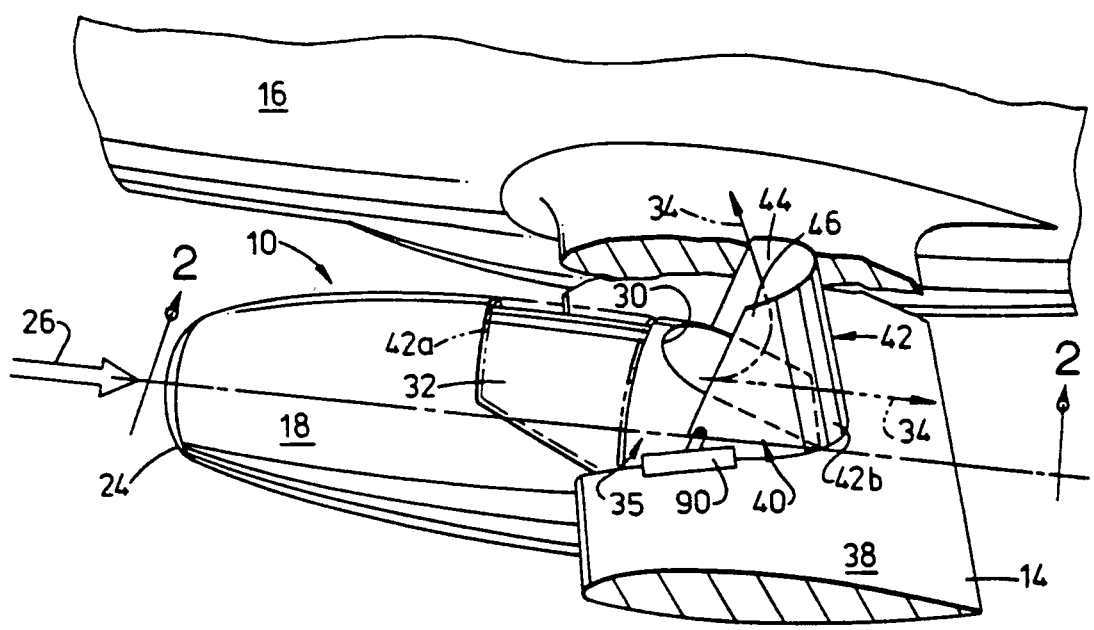
FIG. 1 is a perspective view of an exemplary turbofan gas turbine engine mounted over an aircraft wing and including a thrust reverser assembly in accordance with one embodiment of the present invention.
FIG. 5 is a perspective view of the actuator and linkage components on one side of the thrust reverser assembly illustrated in FIG. 4 taken along line 5—5 shown with removal of an access door.
Figure 2:
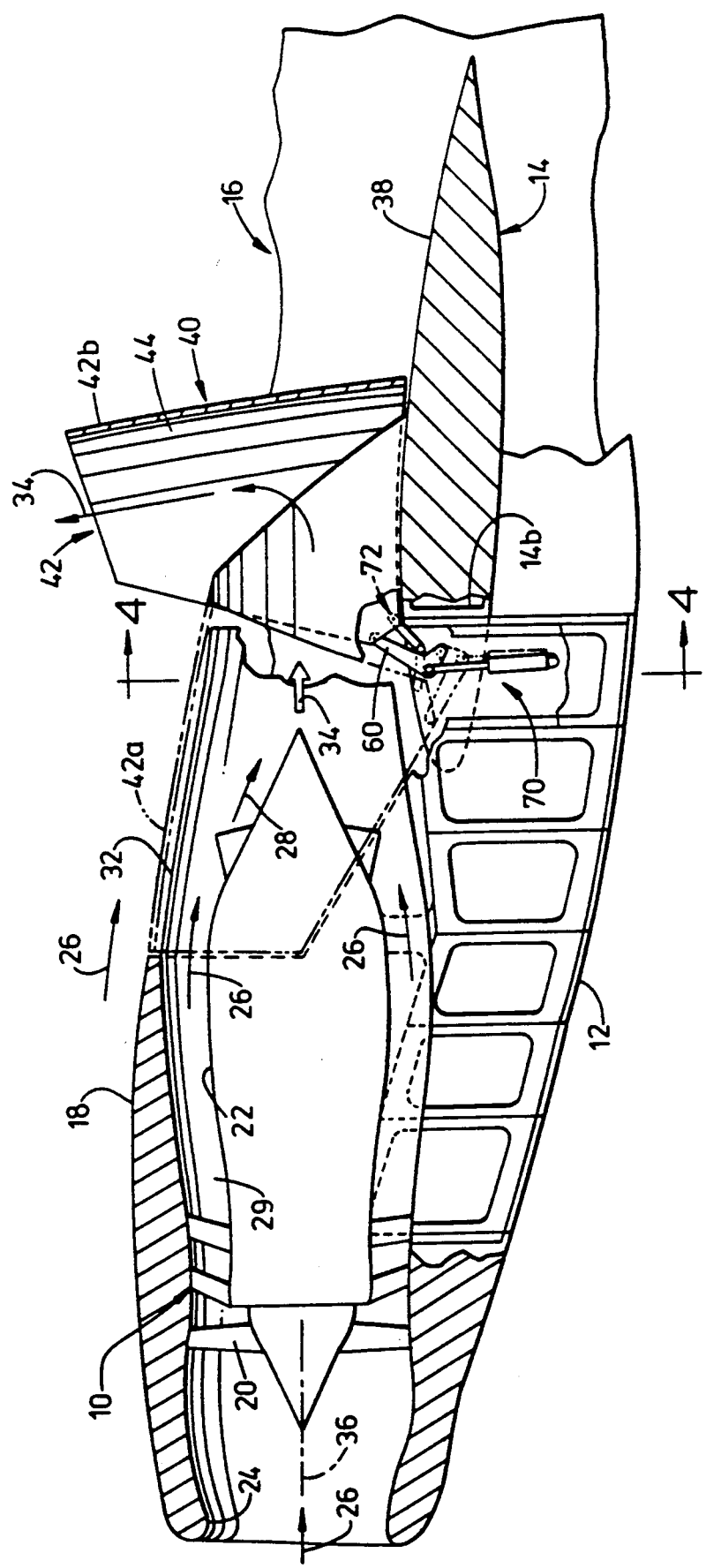
FIG. 2 is a transverse sectional view, partly schematic, taken through the thrust reverser assembly illustrated in FIG. 1 along line 2—2.

Illustrated in FIGS. 1 and 2 is an exemplary turbofan gas turbine engine 10 conventionally mounted by a pylon 12 over and partly forward of a wing 14 extending from an aircraft 16, only a portion of which is shown. The engine 10 is surrounded by a conventional nacelle 18 and includes a conventional fan 20 and core engine 22 therein. The engine 10 also includes an inlet 24 for receiving ambient air 26 which is channeled through the fan 20 and the core engine 22, wherein it is compressed and burned with fuel for generating combustion gases 28. A conventional bypass duct 29 surrounds the core engine 22 and channels a portion of the inlet air 26 which is mixed with the combustion gases 28 and discharged through a conventional outlet 30 of an exhaust nozzle 32 as exhaust gases 34. More specifically, the nozzle 32 includes a rearwardly tapering exhaust fairing 35 which defines the outlet 30 as an elongated opening.

The engine 10 and exhaust nozzle 32 have a common axial centerline axis 36 extending therethrough which is disposed generally parallel to the wing 14 and an outer, upper surface 38 thereof. During conventional operation of the engine 10 the exhaust gases 34 are channeled parallel to the centerline axis 36 through the exhaust nozzle 32 and rearwardly from the outlet 30 over the wing outer surface 38 as shown in dashed line in FIG. 1.

Figure 3:
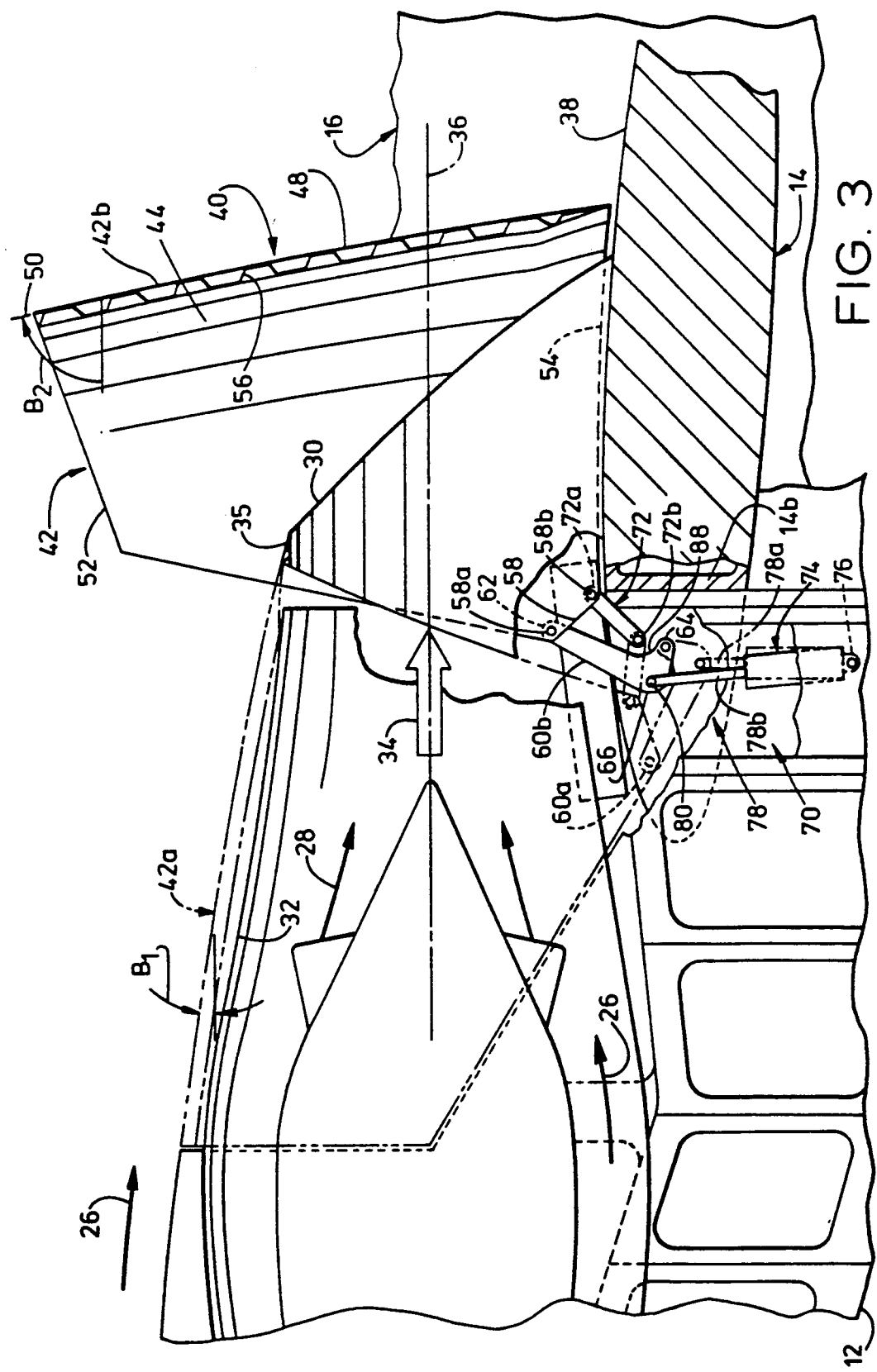
FIG. 3 is an enlarged sectional view of the thrust reverser assembly illustrated in FIG. 2.
Figure 3A:
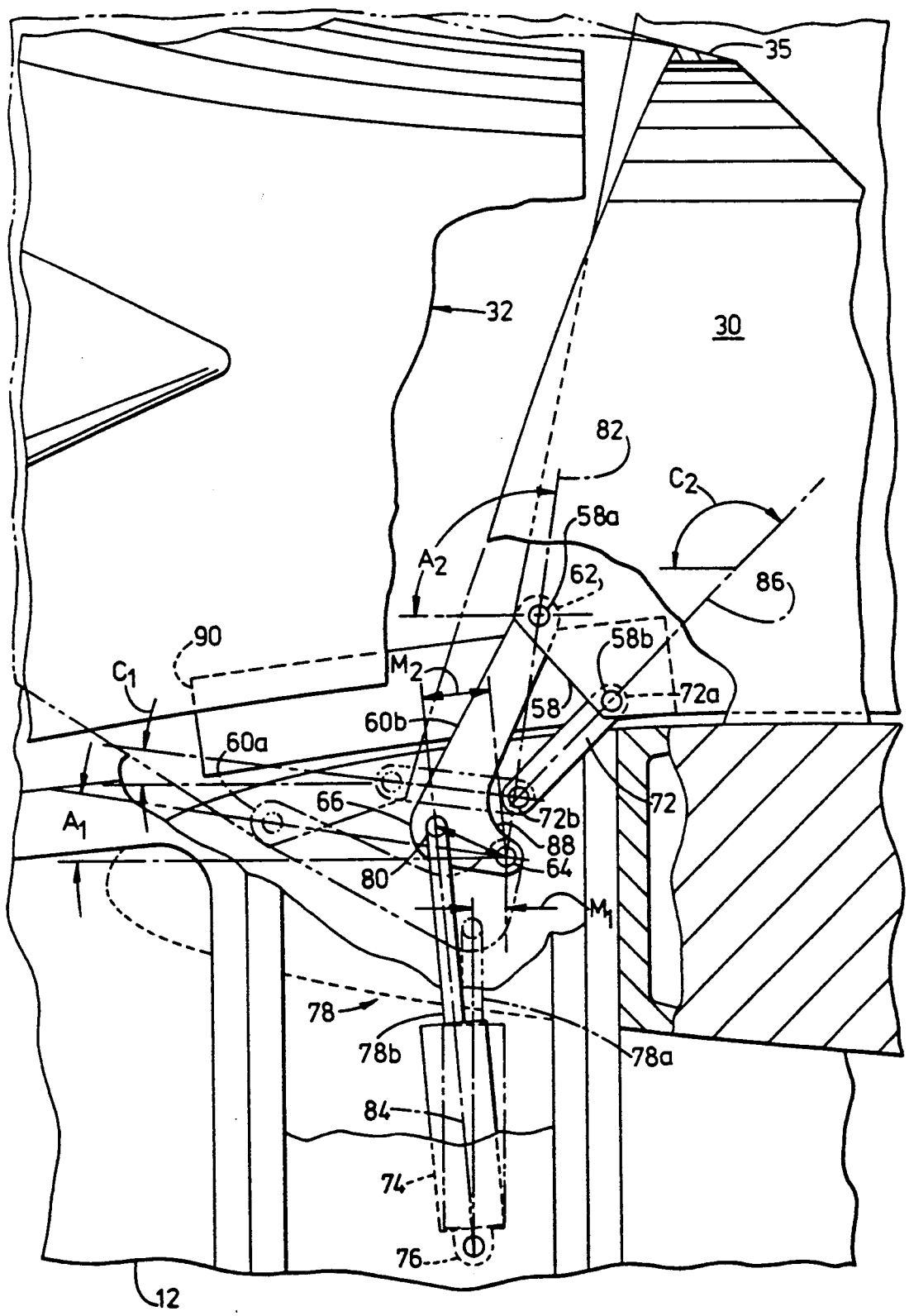
FIG. 3A is an enlarged view of a portion of the actuation assembly illustrated in FIG. 3.
Figure 4:
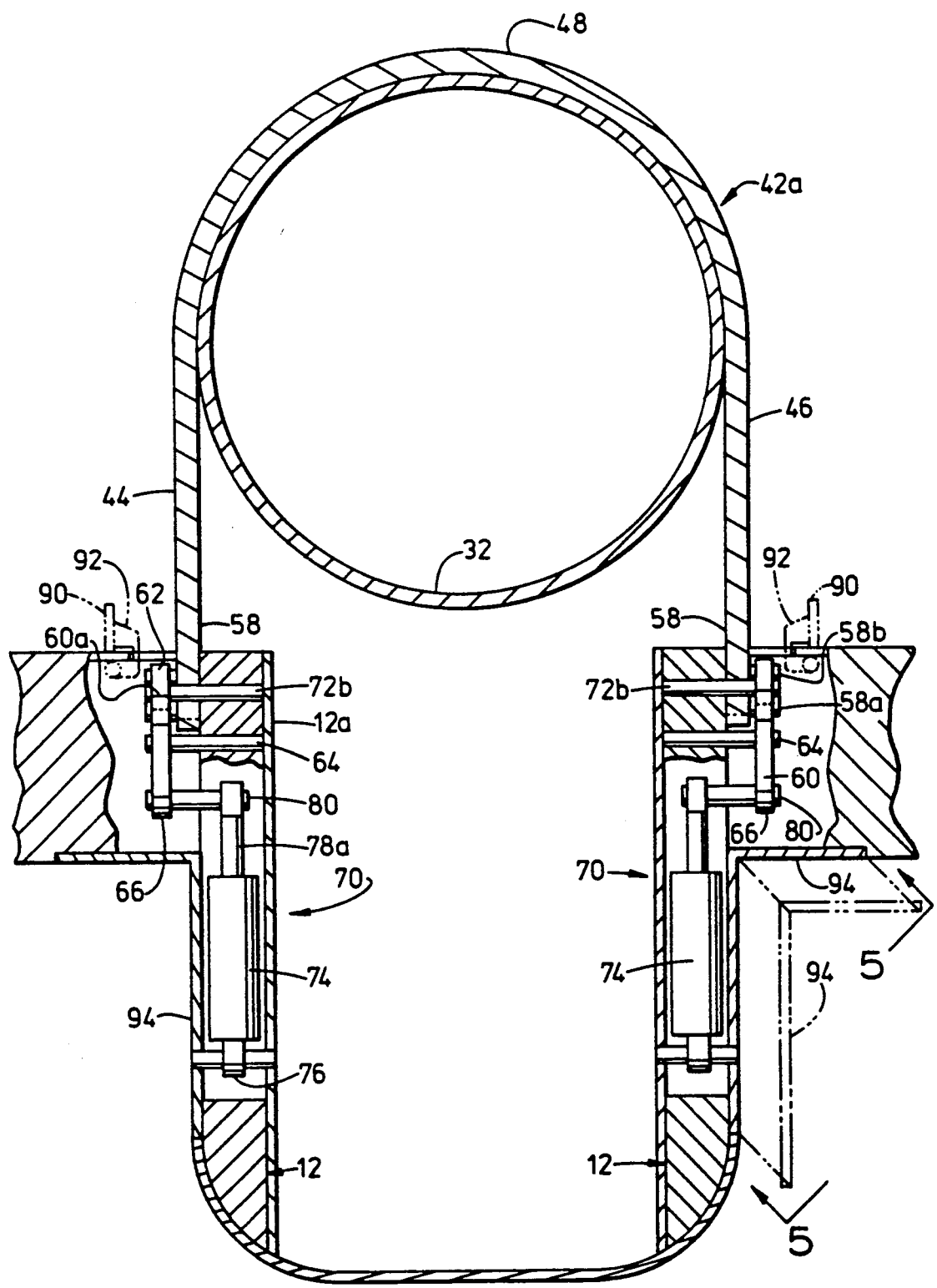
FIG. 4 is a transverse sectional view of a portion of the thrust reverser assembly illustrated in FIG. 2 taken along line 4—4.

When the aircraft 16 is landing, reversal of the exhaust gases 34 is obtained by a thrust reverser assembly 40 in accordance with a preferred embodiment of the present invention. FIGS. 2 and 3 illustrate in more particularity the assembly 40. The assembly 40 includes a generally U-shaped single deflector 42 having first and second respectively. In FIGS. 1, 2 and 3, the deflector 42 is shown in dashed line, designated 42a, in its stowed position around the exhaust nozzle 32 and aerodynamically blended with the nacelle 18. It is shown in solid lines, designated 42b, in its deployed position for obtaining thrust reversal. In FIG. 4, the deflector 42 is shown in solid line in its stowed position.

Referring to FIGS. 3 and 4, the sides 44 and 46 are joined together by a base 48 which is arcuate in the transverse plane to define the generally U-shaped cross section of the deflector 42. The base 48 defines a deflector longitudinal axis 50 which is generally straight. The base 48 extends between longitudinally spaced-apart, open forward and aft opposite ends 52 and 54, respectively, of the deflector 42. Since the deflector is generally U-shaped, each of the forward and aft ends 52 and 54 is also U-shaped. The deflector 42 also includes a plurality of longitudinally spaced, generally U-shaped, arcuate stiffening ribs 56 extending circumferentially along inner surfaces of the first and second sides 44 and 46 and the base 48. The ribs 56 allow the deflector 42 to be relatively lightweight while providing structural rigidity for accommodating aerodynamic and actuation loads during operation.

The deflector first and second sides 44, 46 each includes an intermediate end 58 disposed between the forward and aft ends 52 and 54 at a maximum distance from the base 48. The deflector 42 is positionable in the stowed position 42a around exhaust nozzle 32 so that the first and second sides 44 and 46 extend adjacent to the wing outer surface 38 and the intermediate ends 58 are positioned closely adjacent thereto and the aft end 54 is disposed forward of the exhaust fairing 35 and the nozzle outlet 30 for allowing substantially unobstructed discharge of the exhaust gases 34 from the nozzle outlet 30.

The reverser assembly 40 also includes a pair of first bellcranks 60 each positioned adjacent to a respective one of the first and second deflector sides 44 and 46. Each bellcrank 60 includes a distal end 62 pivotally joined to a forward pivot 58a of a respective deflector side intermediate end 58 adjacent to the forward end 52, and, for example, is attached to one of the support ribs 56. The first bellcrank 60 also includes a proximal end 64 pivotally supported below the wing surface 38 and an intermediate end 66 disposed between the distal and proximal ends 62 and 64. The bellcrank proximal end 64 may be conventionally fixedly connected to a side plate 12a of the pylon 12 as illustrated more particularly in FIG. 4.

The reverser assembly 40 further includes means 70 for rotating each of the first bellcranks 60 about their proximal ends 64 from a first bellcrank first position designated 60a wherein the deflector 42 is in the stowed position 42a, to a second position designated 60b wherein the deflector 42 is in the deployed position 42b.

A pair of second bellcranks 72 is pivotally connected to the deflector 42 with each second bellcrank 72 being positioned adjacent to a respective one of the first and second deflector sides 44 and 46. Each second bellcrank 72 includes a distal end 72a conventionally pivotally joined to an aft pivot 58b of a respective deflector intermediate end 58. Each second bellcrank 70 also includes a proximal end 72b conventionally pivotally supported below the wing surface 38.

The first and second bellcranks 60 and 72 are positioned and configured for controlling angular orientation of the deflector 42 for positioning the deflector 42 from the stowed position 42a to the deployed position 42b so that the aft end 54 is disposed against the wing surface 38 and the base 48 extends outwardly from the wing surface 38 for deflecting the exhaust gases 34 upwardly and out from the forward end 52 for obtaining thrust reversal.

In the preferred embodiment, the deflector aft end 54 is disposed generally perpendicularly to the centerline 36. In the deflector stowed position 42a, exhaust flow from the nozzle outlet 30 is not obstructed. The aft end 54 is so positioned to ensure that it may be positioned fully against the wing outer surface 38 for inclining forwardly the deflector 42 in its deployed position 42b for obtaining effective exhaust flow reversal.

As illustrated in FIGS. 3 and 4, the rotating means 70 include a pair of conventional linear actuators 74 disposed below the wing surface 38 and each positioned adjacent to a respective one of the first bellcranks 60, and adjacent to a respective first and second deflector side 44 and 46, with each actuator 74 including a support end 76 conventionally pivotally joined to the pylon 12, for example. Each actuator 74 includes an extendable rod 78 having a conventional rod end 80 pivotally joined to a respective bellcrank intermediate end 66. The rod 78 is disposed in a retracted position designated 78a when the deflector 42 is in the stowed position 42a, and in an extended position 78b when the deflector 42 is in the deployed position 42b, as shown in dashed line in FIG. 3. Of course, in other embodiments of the present invention, the actuator 74 could be positioned differently so that its retracted position 78a is associated with the deflector deployed position 42b, and its extended position 78b is associated with the deflector stowed position 42a.

In a preferred embodiment, the distal, proximal and intermediate ends 62, 64, and 66 of each of the first bellcranks 60 are arranged in a triangle and the first bellcrank distal and proximal ends 62 and 64 define therebetween a first bellcrank longitudinal axis 82. The bellcrank longitudinal axis 82 is preferably disposed generally perpendicularly to the wing surface 38 in the first bellcrank second position 60b, and generally below the wing surface 38 in the first bellcrank first position 60a. One advantage of this arrangement, described in more detail hereinbelow, is to allow a relatively large translation aft of the deflector 42 upon rotation of the first bellcranks 60 from the first to second positions 60a and 60b, with the first bellcranks 60 disposed below the wing surface 38 in the first position 60a for obtaining a more compact assembly.

Each of the actuators 74 has a longitudinal centerline axis 84 and the actuator rod 78 is preferably positioned generally perpendicular to the nozzle centerline axis 36, as well as the wing surface 38, during both the deflector stowed position 42a and deployed position 42b. The actuator centerline axis 84 is spaced from the first bellcrank proximal end 64 to define a first moment arm designated $M_1$ when the actuator rod 78 is in the retracted position 78a and the first bellcrank 60 is in its first position 60a. The actuator centerline axis 84 is also spaced from the bellcrank proximal end 64 to define a second moment arm designated $M_2$ when the actuator rod 78 is in its extended position 78b and the first bellcrank 60 is in its second position 60b, with the second moment arm $M_2$ being greater than the first moment arm $M_1$. The above arrangement of the actuator 74 and the first bellcrank 60 allows the actuator 74 to be mounted below the wing surface 38 for providing improved serviceability as well as for providing force and motion amplification and relatively large travel of the first bellcrank 60.

More specifically, in the deflector stowed position 42a, relatively little actuation torque is required to rotate and deploy the deflector 42, and therefore the first moment arm $M_1$ can be preferably sized relatively small. However, when the deflector 42 is disposed in the deployed position 42b, relatively large actuation torque is required to accommodate pressure forces from the airflow 26 flowing at relatively high velocity over the nacelle 18 and against the deflector 42 as it is deployed during landing, and from the exhaust gases 34. Accordingly, the second moment arm $M_2$ is preferably larger than the first moment arm $M_1$ to increase mechanical advantage to effectively amplify the force from the actuator 74. This allows for more torque being transmitted through the first bellcrank 60 for accommodating these forces, and for relatively easily retracting the deflector 42 from the deployed position 42b to the stowed position 42a.

Furthermore, by initially positioning the first bellcrank 60 generally parallel to and below the wing surface 38 (i.e. position 60a), and positioning the actuator 74 generally perpendicular to the nozzle centerline axis 36, and positioning the first bellcrank intermediate end 66 relatively close to the proximal end 64 with the relatively small first moment arm $M_1$, relatively little extension of the actuator output rod 78 is required for obtaining relatively large rotational movement of the first bellcrank 60 from its first position 60a to its second position 60b. In the exemplary embodiment illustrated, the bellcrank 60 moves from its first position 60a at a first rotation angle $A_1$ of about 15° relative to the nozzle centerline axis 36 to its second position 60b at a second rotation angle $A_2$ of about 90° relative thereto for a total range of travel of about 75° with relatively small extension of the actuator rod 78.

Also in this regard, as shown in FIG. 3, the nozzle centerline axis 36 is spaced outwardly from the wing surface 38 and the first and second bellcrank distal ends 62 and 72a are spaced outwardly from the wing outer surface 38 and below the nozzle centerline axis 36 in the deflector deployed position 42b. Furthermore, the first bellcrank 60 can be made relatively longer than the second bellcrank 72 for obtaining relatively large translation aft of the deflector 42 by rotation of both bellcranks 60 and 72 to ensure that little or no back pressure is generated in the exhaust gases 34 when the deflector 42 is disposed in its deployed position 42b. Also in this regard, the nozzle outlet 30 is elongated in the axial direction so that its trailing edge faces upwardly, for example, at about 45° relative to the axis 36, for providing a relatively large outlet 30 for more easily reversing the exhaust gases 34 and reducing back pressure.

As illustrated in FIGS. 1 and 2, when the deflector 42 is in its stowed position 42a, it is aligned generally with the nacelle 18 for providing a relatively aerodynamically smooth outer contour, with the deflector forward end 52 butting against the nacelle 18.

As illustrated in FIG. 3, the deflector longitudinal axis 50 is inclined at a first inclination angle $B_1$ relative to the nozzle centerline axis 36 in the deflector stowed position 42a. In the deflector deployed position 42b, the deflector longitudinal axis 50 is positioned at a second inclination angle $B_2$ relative to the nozzle centerline axis 36, with the second inclination angle $B_2$ being substantially greater than the first inclination angle $B_1$. In the deflector stowed position 42a, the deflector base 48 is generally parallel to the nozzle centerline axis 36 and in the deflector deployed position 42b, the deflector base 48 is disposed generally perpendicularly to the nozzle centerline axis 36 and the wing outer surface 38. Thusly, the deflector 42 has a substantial angular travel with the first inclination angle $B_1$ being about 15° and the second inclination angle $B_2$ being about 80° for placing the deflector 42 in the deployed position 42b for providing thrust reversal.

As illustrated in FIG. 3, the proximal and distal ends 72b and 72a of the second bellcrank 72 define therebetween a longitudinal axis 86. The first and second bellcrank longitudinal axes 82 and 86 have a length defining first and second radii of rotation $R_1$ and $R_2$, respectively, with the second radius $R_2$ being less than the first radius $R_1$. As described above, the first bellcrank 60 is rotatable about its proximal end 64 over a range from about 15° to about 90°, with corresponding rotation of the distal end 62 at the radius $R_1$. Similarly, the second bellcrank 86 is rotatable about its proximal end 72b over a range from a first rotation angle $C_1$ of about 15° relative to the centerline axis 36 to a second rotation angle $C_2$ of about 130°, with corresponding rotation of its distal end 72a at the radius $R_2$. In a preferred embodiment of the invention, the first and second bellcrank proximal ends 64 and 72b are generally radially aligned relative to the axial centerline axis 36 with the second bellcrank proximal end 72b being disposed above the first bellcrank proximal end 64 relative to the wing upper surface 38. The first bellcrank 60 is preferably arcuate for having a concave recess 88 disposed closely adjacent to the intermediate end 66. The concave recess 88 is disposed adjacent to the second bellcrank proximal end 72b in the deflector deployed position 42b for increasing the rotational range of the first bellcrank 60 prior to abutting the second bellcrank 72.

The above arrangement of the first and second bellcranks 60 and 72 results in a relatively compact arrangement positionable fully below the wing surface 38 in the deflector stowed position 42a, with the first and second bellcranks 60 and 72 extending from below the wing surface 38 generally radially outwardly therefrom during the deflector deployed position 42b.

As described above, the first bellcrank 60 is positionable from the first rotation angle $A_1$ of about 15° to the second rotation angle $A_2$ of about 90°, which corresponds with positioning of the second bellcrank 72 at its first rotation angle $C_1$ about 15° to its second rotation angle $C_2$ of about 130°, corresponding with the deflector stowed position 42a and deployed position 42b, respectively. The relative difference in rotation, or range, of the first and second bellcranks 60 and 72 is represented by the difference of the angles $A_2-A_1$ and $C_2-C_1$ with the rotational range for the first bellcrank 60 being about 75° which is preferably substantially smaller than the range of rotation of the second bellcrank 72, i.e. 115°.

These exemplary angular positions and rotational ranges of the first and second bellcranks 60 and 72 are preferred for providing a relatively compact actuation assembly having relatively large translation and rotation of the deflector 42. In operation, the actuator 74 is conventionally actuated for extending the rod 78 to cause the first bellcrank 60 to rotate about its proximal end 64. The second bellcrank 72 acts as an idler link and rotates about its proximal end 72b for translating aft the deflector along the arc of the radius $R_2$. As the deflector aft pivot 58b is translated aft, the forward pivot 58a is rotated over the larger radius $R_1$ which controls the angular orientation of the deflector 42 as it is deployed. Although the first bellcrank 60 rotates over a smaller range than that of the second bellcrank 72, it rotates about a larger radius $R_1$ which causes the deflector 42 to rotate clockwise relative to the deflector aft pivot 58b for obtaining the deployed position 42b.

Since the deflector 42 is supported by two pairs of bellcranks on each side thereof, i.e. first and second bellcranks 60 and 72, the reaction loads on the deflector 42 are accommodated by the four spaced bellcranks for providing stable deployment of the deflector 42 against the loads imposed by the exhaust gases 34 and the airflow 26.

As illustrated in FIGS. 1 and 4, two fairing doors 90 are preferably pivotally joined to the wing surface 38 adjacent to the first and second deflector sides 44 and 46, respectively, with each of the fairing doors 90 being disposed in a first position coextensive with the wing surface 38 for covering the first and second bellcranks 60 and 72 in the deflector stowed position 42a. And, in a second position, the fairing doors 90 are disposed generally perpendicularly to the wing surface 38 for uncovering the first and second bellcranks 60 and 72 as they extend outwardly above the wing surface 38 in the deflected deployed position 42b. The fairing doors 90 preferably include a conventional torsional type spring 92 conventionally connected between the door 90 and the wing 14 for retracting the fairing doors 90 to their first positions when the deflector 42 is disposed in its stowed position 42a.

As illustrated in FIGS. 4 and 5, two generally L-shaped access doors 94 are conventionally removably attached (by locking screws, for example) to the pylon 12 and the wing 14 into an access opening 96 which provides access to the bellcranks 60 and 72, and the actuator 74. Accordingly, the actuation components for the thrust reverser assembly 40 are readily accessible from below the wing 14 for improved serviceability and maintainability. The first and second bellcranks 60 and 72 and the actuator 74 are positioned in a relatively compact arrangement for reducing the amount of integration needed into the pylon 12 and the wing 14. Although these components are disposed relatively compactly, they provide for effective deployment of the deflector 42 over the relatively large deployment range and translation aft of the deflector 42 while providing effective reaction load support during deployment and retraction thereof.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. For an exhaust nozzle of a gas turbine engine having an axial centerline axis and supported by a wing for discharging exhaust gases from an exhaust fairing outlet thereof over a surface of said wing, a thrust reverser assembly comprising:

a generally U-shaped deflector having first and second spaced-apart sides joined together by a base, and spaced-apart open forward and aft ends, said sides including first and second intermediate ends, respectively, disposed between said forward and aft ends, spaced from said base and positioned adjacent to said wing surface in said deflector stowed position, said deflector being positionable in a stowed position around said exhaust nozzle so that said first and second intermediate ends are disposed adjacent to said wing surface and said aft end is disposed forward of said nozzle outlet for allowing substantially unobstructed discharge of said exhaust gases from said nozzle outlet, and in a deployed position for changing direction of said exhaust gases for thrust reversal;

a pair of first bellcranks each positioned adjacent to a respective one of said first and second deflector sides, each first bellcrank including a distal end pivotally joined to a forward pivot of a respective deflector side intermediate end, a proximal end pivotally supported below said wing surface, and an intermediate end disposed between said distal and proximal ends;

means for rotating each of said first bellcranks about said proximal end from a first position wherein said deflector is in said stowed position to a second position wherein said deflector is in said deployed position; and a pair of second bellcranks each positioned adjacent to a respective one of said first and second deflector sides, each second bellcrank including a distal end pivotally joined to an aft pivot of a respective deflector intermediate end, and a proximal end pivotally supported below said wing surface; and wherein said first and second bellcranks are positioned and configured for controlling angular orientation of said deflector and for positioning said deflector from said stowed position to said deployed position so that said aft end is disposed against said wing surface and said base extends outwardly from said wing surface for deflecting said exhaust gases upwardly and out from said forward end.

2. A thrust reverser assembly according to claim 1 wherein said wing includes a pylon for supporting said engine and wherein said rotating means comprises:

a pair of actuators disposed below said wing surface and each positioned adjacent to a respective one of said first bellcranks, each actuator including a support end pivotally joined to said pylon and an extendable rod having a rod end pivotally joined to said first bellcrank intermediate end; and said rod being in a retracted position when said deflector is in said stowed position and in an extended position when said deflector is in said deployed position.

3. A thrust reverser assembly according to claim 2 wherein:

said proximal, intermediate and distal ends of each of said first bellcranks are arranged in a triangle and said first bellcrank proximal and distal ends define a longitudinal axis therebetween, said first bellcrank longitudinal axis being positioned generally perpendicularly to said wing surface in said first bellcrank second position and generally below said wing surface in said first bellcrank first position;

said actuator includes a longitudinal centerline axis, and said actuator rod is positioned generally perpendicular to said nozzle centerline axis; and said actuator centerline axis is spaced from said first bellcrank proximal end to define a first moment arm when said actuator is in said retracted position and said first bellcrank is in said first position, and said actuator centerline axis is spaced from said first bellcrank proximal end to define a second moment arm when said actuator is in said extended position and said first bellcrank is in said second position, said second moment arm being greater than said first moment arm.

4. A thrust reverser assembly according to claim 3 wherein said nozzle centerline axis is spaced outwardly from said wing surface and said first and second bellcrank distal ends are spaced outwardly from said wing surface and below said nozzle centerline axis in said deflector deployed position.

5. A thrust reverser assembly according to claim 3 wherein said deflector base defines a deflector longitudinal axis and said deflector longitudinal axis is inclined at a first inclination angle relative to said nozzle centerline axis in said deflector stowed position, and at a second inclination angle relative thereto in said deflector deployed position, said second angle being greater than said first angle.

6. A thrust reverser assembly according to claim 5 wherein said deflector base is generally parallel to said nozzle centerline axis in said deflector stowed position and generally perpendicular thereto in said deployed position.

7. A thrust reverser assembly according to claim 6 wherein said deflector first inclination angle is about 15° and said deflector second inclination angle is about 80°.

8. A thrust reverser assembly according to claim 3 wherein said proximal and distal ends of said second bellcrank define a longitudinal axis therebetween, said first and second bellcrank longitudinal axes having lengths defining first and second radii of rotation $R_1$ and $R_2$, respectively, said second radius $R_2$ being less than said first radius $R_1$.

9. A thrust reverser assembly according to claim 8 wherein said first and second bellcrank proximal ends are generally radially aligned relative to said axial centerline axis with said second bellcrank proximal end being disposed above said first bellcrank proximal end relative to said wing surface.

10. A thrust reverser assembly according to claim 9 wherein said first bellcrank is arcuate having a concave recess disposed adjacent to said intermediate end thereof, said concave recess being disposed adjacent to said second bellcrank proximal end in said deflector deployed position.

11. A thrust reverser assembly according to claim 8 wherein:

said first bellcrank is positioned below said wing surface at a first rotation angle in said deflector stowed position, and at a second rotation angle in said deflector deployed position;

said second bellcrank is disposed below said wing surface at a first rotation angle in said deflector stowed position, and at a second rotation angle in said deflector deployed position for translating aft said deflector by rotation about said second bellcrank proximal end; and said first and second bellcranks each have a range of rotation being the difference between the second rotation angle and the first rotation angle, respectively, with the first bellcrank rotation range being less than the second bellcrank rotation range for controlling angular orientation of said deflector from said stowed to deployed positions.

12. A thrust reverser assembly according to claim 11 wherein said first bellcrank rotation range is about 75° and second bellcrank rotation range is about 115°.

13. A thrust reverser assembly according to claim 8 further including two fairing doors pivotally joined to said wing surface adjacent to said first and second deflector sides, respectively, each of said fairing doors being disposed in a first position coextensive with said wing surface for covering said first and second bellcranks in said deflector stowed position, and in a second position generally perpendicular to said wing surface for uncovering said first and second bellcranks in said deflector deployed position.

14. A thrust reverser assembly according to claim 13 wherein each of said fairing doors includes a spring for closing said door when said deflector is disposed in said stowed position.

15. A thrust reverser assembly according to claim 3 wherein:

said proximal and distal ends of said second bellcrank define a longitudinal axis therebetween, said first and second bellcrank longitudinal axes having lengths defining first and second radii of rotation $R_1$ and $R_2$, respectively, said second radius $R_2$ being less than said first radius $R_1$, and said first and second bellcrank proximal ends being generally radially aligned relative to said axial centerline axis with said second bellcrank proximal end being disposed above said first bellcrank proximal end relative to said wing surface;

said first bellcrank is positioned below said wing surface at a first rotation angle in said deflector stowed position, and at a second rotation angle in said deflector deployed position;

said second bellcrank is disposed below said wing surface at a first rotation angle in said deflector stowed position, and at a second rotation angle in said deflector deployed position for translating aft said deflector by rotation about said second bellcrank proximal end; and said first and second bellcranks each have a range of rotation being the difference between the second rotation angle and the first rotation angle, respectively, with the first bellcrank rotation range being less than the second bellcrank rotation range for controlling angular orientation of said deflector from said stowed to deployed positions.

16. A thrust reverser assembly according to claim 15 wherein said first bellcrank is arcuate having a concave recess disposed adjacent to said intermediate end thereof, said concave recess being disposed adjacent to said second bellcrank proximal end in said deflector deployed position.

17. A thrust reverser assembly according to claim 16 wherein said deflector base defines a deflector longitudinal axis and said deflector longitudinal axis is inclined at a first inclination angle relative to said nozzle centerline axis in said deflector stowed position, and at a second inclination angle relative thereto in said deflector deployed position, said second angle being greater than said first angle; and said deflector base is generally parallel to said nozzle centerline axis in said deflector stowed position and generally perpendicular thereto in said deployed position.

18. A thrust reverser assembly according to claim 17 wherein said deflector first inclination angle is about 15° and said deflector second inclination angle is about 80°; and said rotation range of said first bellcrank is about 75° and said rotation range of said second bellcrank is about 115°.

* * * * *